(12) United States Patent
Mertens et al.

(10) Patent No.: US 11,354,367 B2
(45) Date of Patent: *Jun. 7, 2022

(54) SEARCH ENGINE

(71) Applicant: Google LLC, Mountain View, CA (US)

(72) Inventors: Timo Mertens, Millbrae, CA (US); Maxim Gubin, Danville, CA (US)

(73) Assignee: GOOGLE LLC, Mountain View, CA (US)

(*) Notice: Subject to any disclaimer, the term of this patent is extended or adjusted under 35 U.S.C. 154(b) by 95 days.

This patent is subject to a terminal disclaimer.

(21) Appl. No.: 16/838,590

(22) Filed: Apr. 2, 2020

(65) Prior Publication Data
US 2020/0233914 A1 Jul. 23, 2020

Related U.S. Application Data

(63) Continuation of application No. 15/401,592, filed on Jan. 9, 2017, now Pat. No. 10,650,068.

(51) Int. Cl.
G06F 16/22 (2019.01)
G06F 16/35 (2019.01)
(Continued)

(52) U.S. Cl.
CPC ...... *G06F 16/9535* (2019.01); *G06F 16/2237* (2019.01); *G06F 16/24575* (2019.01);
(Continued)

(58) Field of Classification Search
CPC .......... G06F 16/2237; G06F 16/24575; G06F 16/24578; G06F 16/3344; G06F 16/35; G06F 16/9535
See application file for complete search history.

(56) References Cited

U.S. PATENT DOCUMENTS 9,442,985 B2 9/2016 Wiergering et al.
2012/0124061 A1 5/2012 Macbeth
(Continued)

FOREIGN PATENT DOCUMENTS

CN 102945273 A 2/2013
CN 104765769 A 7/2015
(Continued)

OTHER PUBLICATIONS

GB Office Action in Great Britain Application No. GB1717834, dated Dec. 18, 2019, 6 pages.
(Continued)

*Primary Examiner* — Irete F Ehichioya
*Assistant Examiner* — Xiaoqin Hu
(74) *Attorney, Agent, or Firm* — Dority & Manning, P.A.

(57) ABSTRACT

Methods, systems, and apparatus, including computer programs encoded on a computer-storage medium, for using a search engine implemented on a user device to identify topics or tasks associated with native application content. The method may include actions of receiving a set of data that is generated by the native application and that includes (i) native application content, and (ii) context information associated with the native application content, indexing the data on the user device, and then identifying one or more tasks based on the indexed data.

11 Claims, 3 Drawing Sheets

(51) Int. Cl.
*G06F 16/2457* (2019.01)
*G06F 16/33* (2019.01)
*G06F 16/9535* (2019.01)

(52) U.S. Cl.
CPC .... *G06F 16/24578* (2019.01); *G06F 16/3344* (2019.01); *G06F 16/35* (2019.01)

(56) References Cited

U.S. PATENT DOCUMENTS

| | | | |
|---|---|---|---|
| 2012/0265753 A1* | 10/2012 | Booking | G06F 16/903 707/722 |
| 2013/0166543 A1* | 6/2013 | MacDonald | G06F 16/41 707/723 |
| 2014/0358909 A1 | 12/2014 | Kolba, Jr. et al. | |
| 2016/0188719 A1* | 6/2016 | Glover | G06F 16/285 707/706 |
| 2016/0283564 A1 | 9/2016 | Sharon et al. | |
| 2016/0292159 A1 | 10/2016 | Patel | |
| 2017/0124101 A1* | 5/2017 | Nigam | G06F 16/9537 |

FOREIGN PATENT DOCUMENTS

| | | |
|---|---|---|
| CN | 105069457 A | 11/2015 |
| CN | 105279264 A | 1/2016 |
| EP | 1669897 | 6/2006 |

OTHER PUBLICATIONS

International Search Report and Written Opinion issued in International Application No. PCT/US2017/055926, dated Nov. 23, 2017, 17 pages.

Kohonen et al. "Self Organization of a Massive Document Collection," IEEE Transaction on Neural Networks, vol. 11(3) May 1, 2000, 12 pages.

Office Action issued in British Application No. GB1717834.4, dated Apr. 4, 2018, 8 pages.

PCT International Preliminary Report on Patentability in International Application No. PCT/US2017/055926, dated May 9, 2019, 11 pages.

Written Opinion issued in International Application No. PCT/US2017/055926, dated Dec. 18, 2018, 10 pages.

\* cited by examiner

| Label | 200 | 210 |
|---|---|---|
| | ⋮ | ⋮ |
| | Aardvark | 0 |
| | ... | ... |
| | Agent | 0 |
| | ⋮ | ⋮ |
| | Bob | 0 |
| | ⋮ | ⋮ |
| | DC | 0 |
| | ⋮ | ⋮ |
| 220 / 220a | Dupont Circle | 0 |
| | ⋮ | ⋮ |
| | Gelato | .75 |
| | ⋮ | ⋮ |
| | Hotel | 0 |
| | ⋮ | ⋮ |
| 221 / 221a | Ice Cream | 0 |
| | ⋮ | ⋮ |
| | Piazza Navona | .95 |
| | ⋮ | ⋮ |
| 222 / 222a | Zebra | 0 |
| | ⋮ | ⋮ |
| | To: | .36 |
| | ⋮ | ⋮ |
| 223 / 223a | Email App | 0 |
| | ⋮ | ⋮ |
| | Messaging App | 1 |
| | ⋮ | ⋮ |
| | Search App | 0 |
| | ⋮ | ⋮ |
| | Travel App | 0 |
| | ⋮ | ⋮ |
| 224 / 224a | Trip Mentor App | 0 |
| | ⋮ | ⋮ |
| 225 / 225a | Travel App | .85 |
| | 0 | ⋮ |
| | Trip Mentor App | .95 |
| | ⋮ | ⋮ |
| | Travel App | 1 |
| | 0 | ⋮ |
| 226 / 226a | Trip Mentor App | 1 |
| | ⋮ | ⋮ |
| 227 / 227a | Trip Mentor App | 1 |
| | ⋮ | ⋮ |
| 228 / 228a | DC Metro App | 0 |
| | ⋮ | ⋮ |

201 — Known Words / Phrases
202 — Field Associated with App Content
203 — Native App Associated with App Content
204 — Most Recently Used Native Apps
205 — Native Apps Open on User Device

Fig. 2

SEARCH ENGINE

CROSS-REFERENCE TO RELATED APPLICATIONS

This application is a continuation application of, and claims priority to, U.S. patent application Ser. No. 15/401,592, titled "SEARCH ENGINE," filed on Jan. 9, 2017. The disclosure of the foregoing application is incorporated herein by reference in its entirety for all purposes.

BACKGROUND

This specification relates to search engines.

A search engine may generally be described as any system that executes a search and retrieves stored data. A search engine can be configured in a variety of different ways based on the task at hand. For example, some search engines may be configured to perform keyword-based search and retrieval. Such search engines may identify relevant search results based, at least in part, on the number of times a search term appears in one or more particular resources, or each respective resource's metadata. Alternatively, or in addition, some search engines may identify relevant search results by identifying an entity name that is associated with one or more search terms, and then determining the number of occurrences of the entity name in one or more particular resources. In such instances, relevant search results may be obtained based on the number of occurrences of the entity name in the one or more particular resources. The aforementioned ways that a search engine can identify search results responsive to a query are merely exemplary.

A search engine can also be configured to identify search results responsive to a query in a variety of other ways. A custom configuration of a search engine can be employed, as necessary, to solve particular problems related to search and retrieval.

SUMMARY

Aspects of the present disclosure are directed towards organizing, searching, and retrieving application content on a mobile device. Application content items on a mobile device may include (i) personal content such as contacts, messages, call history, documents, notes, calendar events, or the like, (ii) application-specific content that is provided by the application for user consumption, (iii) application-specific content that is provided by the application and is responsive to user interaction, or (iv) a combination thereof. The present disclosure can cluster application content items into one or more different groups such as a topic, task, or the like that can be provided in response to a search query. The present disclosure may generate one or more selectable controls that are each associated with a respective group of application content items that is related to the received search query. In response to the selection of one of the selectable controls, one or more search results may be provided that each reference an application content item that is related to the group associated with the selected control. The search results may be sorted based on the application type that is used to consume or interact with each respective application content item referenced by the search results.

According to one innovative aspect of the present disclosure, a computer-implemented method for using a search engine implemented on a user device to identify topics or tasks associated with native application content is disclosed. The method may include actions of receiving, by a search engine implemented on a user device and for each of multiple native applications on the user device, a set of data that is generated by the native application and that includes (i) native application content, and (ii) context information associated with the native application content, for each set of data that is generated by the native applications, generating, by the search engine implemented on the user device, a cluster feature-vector representation based on the set of data, storing, by the search engine implemented on the user device, the cluster feature-vector representations in a search engine index on the user device, identifying, by the search engine implemented on the user device, a set of cluster feature-vector representations that are associated with a particular feature-vector representation, identifying, by the search engine implemented on the user device, one or more topics or tasks that are associated with the set of cluster feature-vector representations, and providing, for output, a user interface including a selectable control that identifies one or more of the topics or tasks.

Other aspects include corresponding systems, apparatus, and computer programs to perform the actions of methods defined by instructions encoded on computer storage devices.

These and other versions may optionally include one or more of the following features. For instance, in some implementations, generating, by the search engine implemented on the user device, a cluster feature-vector representation based on the set of data may include extracting a first set of one or more features from the native application content, extracting a second set of one or more features from the context information associated with the native application content, and generating a cluster feature-vector representation based on the first set of one or more features and the second set of one or more features.

In some implementations, the first set of one or more features includes features that were extracted from one or more words in the text of the native application content. In the same implementation, or other implementations, the second set of one or more features includes features that were extracted from data that is indicative of one or more fields associated with native application content. In the same implementation, or other implementations, the second set of one or more features includes features that were extracted from data indicative of the popularity of one or more native application installed on the user device. In the same implementation, or other implementations, the second set of one or more features includes features that were extracted from data that is indicative of one or more native applications that were accessed during the same session as the generated set of data.

In some implementations, identifying, by the search engine implemented on the user device, a set of cluster feature-vector representations that are associated with a particular feature-vector representation may include generating, by the search engine implemented on the user device, a query vector based on a search term and a user context, and identifying, by the search engine implemented on the user device, one or more cluster feature-vector representations stored in the search engine index that are similar to the query vector.

BRIEF DESCRIPTION OF THE DRAWINGS

FIG. 2 is an example of a cluster feature-vector that can be used to represent data from native applications.

DETAILED DESCRIPTION

Figure 1:
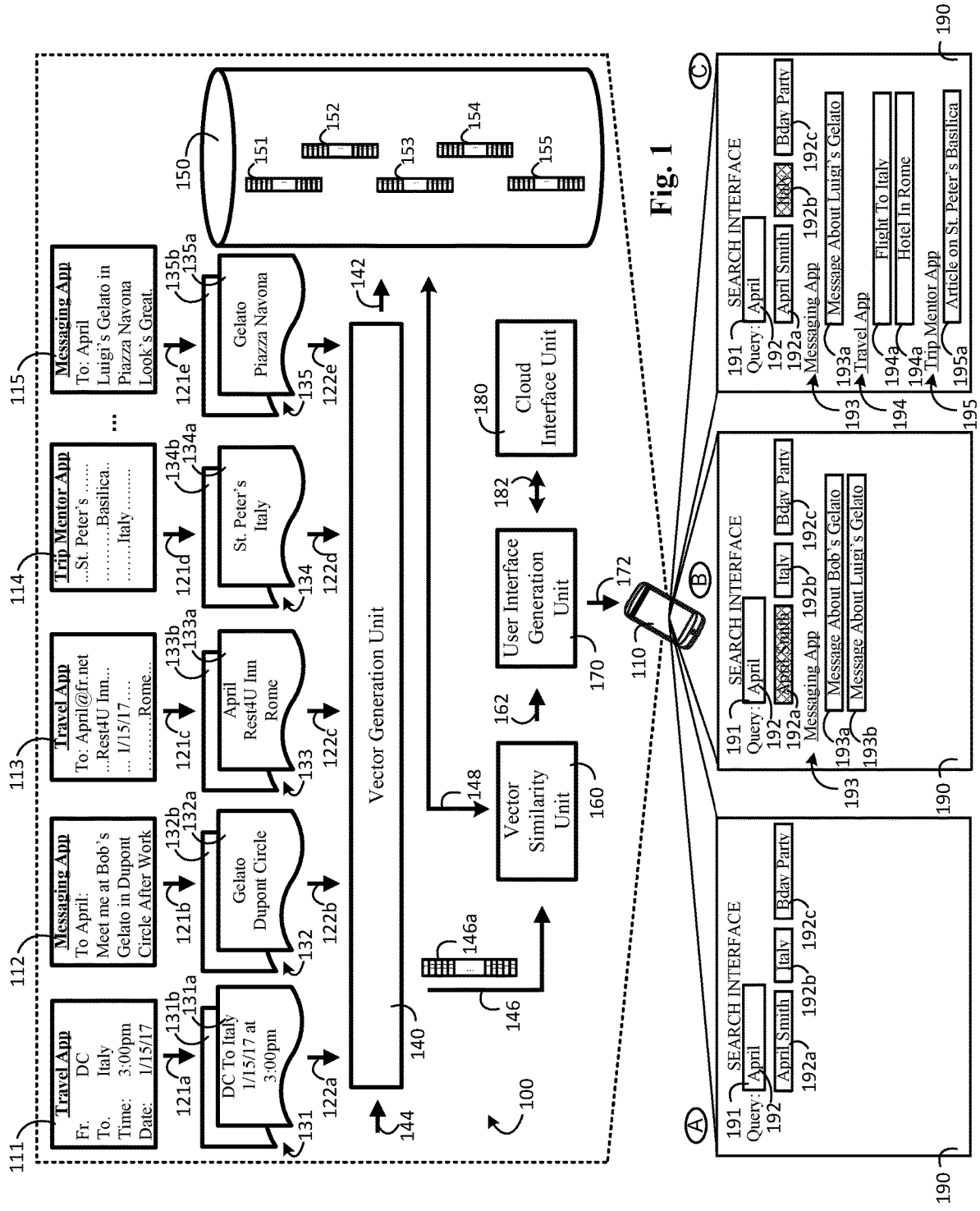
FIG. 1 is a contextual diagram of an example of a search engine for retrieving native application content items.

FIG. 1 is a contextual diagram of an example of a search engine 100 for retrieving native application content items.

The search engine 100 is installed on a user device 110. The search engine 100 may be configured to receive sets of data 131, 132, 133, 134, 135 from one or more native applications 111, 112, 113, 114, 115 that are installed on the user device 110. A native application may include, for example, an application program that has been developed for use on the user device 110. The one or more applications may include any type of mobile application, for example, a travel application, a messaging application, a trip mentor application, a calendar application, a document processing application, a contacts application, a voice calling application, a notes application, an encyclopedia application, or the like. The user device 110 may include, for example, a smartphone, a smartwatch, a tablet, or the like. The search engine 100 installed on the user device 110 includes a vector generation unit 140, a search engine index 150, a vector similarity unit 160, a user interface generation unit 170, and a cloud interface unit 180. Generally, a "unit" may be implemented as one or more software components, one or more hardware components, or a combination thereof. A combination of one or more software components and one or more hardware components results, for example, when the one or more software components are installed on one or more computers in one or more locations allowing the functionality of the software components to be realized.

Each native application 111, 112, 113, 114, 115 installed on the user device 110 is configured to generate 121a, 121b, 121c, 121d, 121e respective sets of data 131, 132, 133, 134, 135. The respective sets of data 131, 132, 133, 134, 135 may be generated based on user interaction with each respective native application 111, 112, 113, 114, 115. The sets of data 131, 132, 133, 134, 135 may include native application content 131a, 132a, 133a, 134a, 135a and context information 131b, 132b, 133b, 134b, 135b. For example, a user may interact with the travel app 111 to book an airline ticket from Washington, D.C. to Italy that is scheduled to depart on Jan. 15, 2017 at 3:00 pm. Based on this user interaction, the native application may generate a set of data 131 that includes native application content 131a such as native application content that was interacted with by the user. In this instance, the trip origin (e.g., DC), the trip destination (e.g., Italy), the trip departure date (e.g., Jan. 15, 2017), and the trip departure time (e.g., 3:00 pm) each individually, or together, are examples of one or more native application content items that were interacted with by the user, as the user created the aforementioned application content. Other forms of user interaction with native application content items may include a user editing native application content, a user viewing native application content, a user hearing native application content, or the like. The search engine 100 may extract one or more features from the native application content to generate a cluster feature-vector that represents the user's interaction or consumption of one or more native application content items.

The sets of data 131, 132, 133, 134, 135 may also include context information 131b, 132b, 133b, 134b, 135b associated with a user's interaction with each respective native application 111, 112, 113, 114, 115 that resulted in the generation of native application content 131a, 132a, 133a, 134a, 135a, respectively. The context information included in a set of data 131, 132, 133, 134, 135 may include data that is associated with a particular native application 111, 112, 113, 114, 115. Alternatively, or in addition, the context information included in the set of data 131, 132, 133, 134, 135 may include data that is obtained from a user profile of the user that interacted with the native application. A user profile may include data that is indicative of the user's usage of each respective native application installed on the user device. As a result, by way of example, a set of data 131 generated by the native application 111 based on a user's interaction with native application 111 may include context information 131b such as information that is indicative of the user's use of native application 111, information that is indicative of the user's use of other native applications 112, 113, 114, 115 in proximity to the native application 111, or the like.

Context information generated by each respective native application 111, 112, 113, 114, 115 may include other types of information. For example, other types of context information 131b, 132b, 133b, 134, 135b may include data that is indicative of a field that is associated with native application content a user interacted with, data that is indicative of user activity with a native application, data that is indicative of native application content creation time, data that is indicative of native application content interaction time, data that is indicative of a number of native application interactions, or the like.

Data that is indicative of a field that is associated with native application content a user interacted with may include, for example, a "To:" field of a message, a "Subject" field of a message, a "Body" field of a message, a "Destination" field of a flight reservation, a "Date" field of a hotel reservation, a "Title" field of an article, or the like. Data that is indicative of user activity with a native application may include, for example, data that is indicative of a number of interactions a user has with a native application, data that is indicative of other native applications the user interacted with while using the native application, data that is indicative of a native application the user used prior to the native application, data that is indicative of a native application the user used after the native application, data that is indicative of patterns of switching between native applications by a user of a user device, and the like. Data that is indicative of native application content creation time may include, for example, a timestamp that indicates when a user created the application content. Data that is indicative of native application content interaction time may include, for example, data that is indicative of the time a user interacted with native application content. For example, interaction time may include a timestamp that is indicative of the time a user viewed native application content in a native application. The number of application interactions may include the number of times a user interacted with a particular native application. The number of times a user interacted with a particular native application may include (i) data indicative of a particular number of total application interactions with the user, (ii) data indicative of a particular number of total application interactions within a predetermined time period, or (iii) a combination thereof. For example, the number of application interactions may include data that indicates a user opened the notes application 20 times, a user opened a travel application 46 times over the past week, or the like.

In some implementations, a set of data 131, 132, 133, 134, 135 may include multiple types of independent native application content items that, when collectively analyzed, may be indicative of one or more overarching topics, tasks, or the like that can categorize a user's activity at a time of the user's interaction with the native applications 111, 112, 113, 114, 115 that generated the sets of data 131, 132, 133, 134, 135. Multiple native application content items related to the same topic may be described as multiple native application content items that share the same subject. For example, multiple native application content items related to the same topic may include a set of multiple messages that were sent to the same recipient, a set of multiple messages to different recipients related to the same subject, a set of multiple disparate types of application content items related to the same subject, or the like.

Alternatively, multiple native application content items related to the same task may include multiple native application content items that are related to the same purpose, goal, or the like. By way of example, a user may be engaged in a task, over time, that includes planning a trip to Italy. During the course of planning the trip to Italy, the user may interact with multiple different native applications at different periods of time over the course of days, weeks, or even months to, e.g., book a flight reservation to Italy using the Travel App 111, book a hotel reservation in Rome using a Travel App 113 (e.g., the same travel app as travel app 111 or a different travel app than travel app 111), review descriptions of tourist destinations using a Trip Mentor App 114, search for restaurants or specialty shops (e.g., a Gelato shop) in Rome using a search engine, send messages about specialty shops (e.g., a Gelato shop) the user is interested in visiting in Rome to the user's spouse using a messaging App 115 (e.g., the same messaging app as messaging app 113 or a different messaging app than messaging app 113), or the like. The context data generated based on the aforementioned native application interactions may be obtained. Then, one or more features may be extracted from the obtained context data and be used to generate a cluster feature-vector that represents the native application interaction in a feature vector space.

The vector generation unit 140 is configured to receive 122a, 122b, 122c, 122d, 122e one or more sets of data 131, 132, 133, 134, 135 that have been generated by native applications 111, 112, 113, 114, 115. The sets of data received by the vector generation unit 140 include native application content and context information. The vector generation unit 140 may extract features from the received sets of data 131, 132, 133, 134, 135. For example, the vector generation unit 140 may extract features from the native application content 131a, 132a, 133a, 134a, 135a and context information 131b, 132b, 133b, 134b, 135b. The vector generation unit 140 may process the received sets of data 131, 132, 133, 134, 135 to generate a cluster feature-vector for each received set of data 131, 132, 133, 134, 135.

Each cluster feature-vector may be generated based on the text of application content 131a, 132a, 133a, 134a, 135a. For example, in some implementations, features may be extracted from every word in the application content 131a, 132a, 133a, 134a, 135a and used to generate the cluster feature-vector. The text of the application content may be annotated based on the application fields associated with the content. Accordingly, features associated with the structure of the native application document used to receive and display text on the native application interface may be built into the cluster feature-vector.

Alternatively, or in addition, each cluster feature-vector may be generated based on the entities identified by the text of the native application content 131a, 132a, 133a, 134a, 135a. For example, the vector generation unit 140 can extract features from the contact names, names of non-contact persons, place names, country names, city names, business names, or the like included in the native application content 131a, 132a, 133a, 134a, 135a. Accordingly, features associated with particular entity names that are identified in the text of native application content 131a, 132a, 133a, 134a, 135a may be built into the cluster feature-vector.

Alternatively, in addition, each cluster feature-vector may be generated based on the context information 131b, 132b, 133b, 134b, 135b received from each respective native application. For example, vector generation unit 140 can extract features from context information 131b, 132b, 133b, 134b, 135b that includes data that is indicative of user activity related to one or more native applications 111, 112, 113, 114, 115 installed on the user device 110. For example, features may be extracted from context information 131b, 132b, 133b, 134b, 135b such as data that is indicative of the popularity of one or more native applications installed on the user device 110 and the extracted features can be used to generate a cluster feature-vector.

Alternatively, or in addition, features may be extracted from context information 131b, 132b, 133b, 134b, 135b such as data that is indicative of patterns of switching between applications independent of session, data that is indicative of patterns of switching between applications in the same session, or the like and the extracted features can be used to generate a cluster feature-vector. Such features may beneficial because if user interactions with multiple native applications within a predetermined threshold amount of time, the native application content associated with those user interactions can be related to the same topic, task, or the like. Alternatively, or in addition, features may be extracted from context information 131b, 132b, 133b, 134b, 135b such as data that is indicative of application content creation time, data that is indicative of application content interaction time, data that is indicative of a number of interactions a user has with a native application, or the like and then the extracted features can be used to generate the cluster feature-vector.

Each cluster-feature vector is a numerical representation of each set of data 131, 132, 133, 134, 135 that is received from the native applications. The numerical representation quantifies a relationship between features extracted from each respective set of data 131, 132, 133, 134, 135 and an established cluster feature-vector vocabulary. The cluster feature-vector vocabulary may include an entry for every known word or phrase in a particular language. In addition, the cluster feature-vector vocabulary may include one or more additional entries that are related to context information provided by native applications. For example, the cluster feature-vector vocabulary may include one or more entries to represent each native application installed on the user device 110, one or more entries to represent native applications that are related to the native application that generated the set of data on which the cluster feature-vector is based, one or more entries to represent native applications used in the same session as the native application that generated the set of data on which the cluster-feature vector is based, one or more entries to represent the native application used prior to the native application that generated the set of data on which the cluster feature-vector is based, one or more entries to represent the native application that was used after the native application that generated the set of data on which the cluster feature-vector was based, one or more entries to represent the popularity of the native application that generated the set of data on which the cluster feature-vector is based, one or more entries to represent the content creation time of the application content on which the cluster feature-vector is based, one or more entries to represent the content interaction time of the application content on which the cluster feature-vector is based, one or more entries to represent one or more fields associated with the application content on which the cluster feature-vector is based, or the like.

The vector generation unit 140 may store 142 each generated cluster feature-vector in the search engine index 150. The search engine index 150 is a cluster feature-vector storage area that organizes each of the cluster feature-vectors generated by the vector generation unit 140. For example, the search engine index 150 may store a first cluster feature-vector 151 based on the first set of data 131, a second cluster feature-vector 152 that is based on the second set of data 132, a third cluster feature-vector 153 that is based on the third set of data 133, a fourth cluster feature-vector 154 that is based on the fourth set of data 134, a fifth cluster feature-vector 155 that is based on the fifth set of data 135, and so on. Each cluster feature-vector stored in the search engine index 150 may be used to identify a native application content item (e.g., a message 135*a*) on which the cluster feature-vector is based. Therefore, instead of, or in addition to, performing a keyword search based of application content items, the user device 110 may use the search engine 100 to perform a vector similarity search of the cluster feature-vectors stored in the search engine index 150.

The vector generation unit 140 may be configured to add additional cluster feature-vectors to the search engine index 150 each time a native application generates an additional set of data. Therefore, the cluster feature-vector generation process described above may continually execute as a background process as a user uses the native applications 111, 112, 113, 114, 115 to interact with native application content in real-time. However, in some implementations, the sets of data generated by the native applications may be cached. Then, the cached sets of data may be provided as a batch to the vector generation unit 140 based on one or more batch processing rules (e.g., expiration of a predetermined period of time, detection that the number of cached items satisfies a predetermined threshold, detection that the user device 110 is plugged into a power source such as a wall outlet, in response to an instruction from a user, or the like).

Implementations that perform batch-processing of multiple sets of data may be more efficient and use less resources than implementations that continually use the vector generation unit 140 as a background process. This is because, in such implementations, the vector generation unit 140 is not continually running as a background process as each set of data generated by the native applications 111, 112, 113, 114, 115 in real-time. Such batch-processing systems may help to conserve usage of the user device's 110 battery. Instead of continuously running in the background, the vector generation unit 140 in a batch-processing implementation may only be running as a background process to generate cluster feature-vectors when the search engine 100 determines that a batch processing rule has been satisfied. On the other hand, however, a real-time processing implementation that continually runs the vector generation unit 140 in the background to generate cluster feature-vectors in real-time as respective sets of data are received from native applications 111, 112, 113, 114, 115 also has advantages. For instance, such real-time processing implementations may provide a more robust and accurate search engine index 150 than systems that perform batch-processing because such real-time systems have an index that is always updated to include cluster feature-vectors representing the most recent native application content with which the user has interacted.

The search engine 100 may include a user interface generation unit 170 that provides a user interface 190 for display on the graphical user interface of the user device 110. At stage A, the user interface 190 may include query input field 191 that is configured to receive one or more search terms 192. At stage A, by way of example, a user of the user device 110 has input the search term "April." The user device 110 may provide 144 (i) the one or more search terms 192 "April" and (ii) context information to the vector generation unit 140. The search engine may process the one or more search terms as described in detail below, and generate one or more selectable control 192*a*, 192*b*, 192*c*. Alternatively, the one or more selectable controls 192*a*, 192*b*, 192*c* may be provided for display on the user interface 190 when a user of user device 110 opens an application that provides the user interface 190. For example, the one or more selectable controls 192*a*, 192*b*, 192*c* may be provided for display in response to a zero-input query.

The context information provided 144 to the vector generation unit 140 may be indicative of a user context at the time of submission of the one or more search terms 192. Alternatively, or in addition, the context information provided 144 to the vector generation unit 140 may be indicative of a user context within a predetermined threshold of time prior to submitting the one or more search terms. For example, the context information may include data that is indicative of a user context during the 30 seconds prior to submitting the query terms 192, the 1 minute prior to submitting the query terms 192, the 5 minutes prior to submitting the query terms 192, or the like. Context information describing a user context may include, for example, data that describes the user's interactions with one or more native applications 111, 112, 113, 114, 115. Data describing the user's interactions with one or more native applications 111, 112, 113, 114, 115 may include data indicating the native applications 111, 112, 113, 114, 115 used by the user, data indicating the native applications 111, 112, 113, 114, 115 open by the user at, or near, the time the query terms 192 were submitted, the order in which a user has used native application programs 111, 112, 113, 114, 115, the frequency with which the user uses native applications 111, 112, 113, 114, 115 installed on the user device 110, or the like. In some implementations, the context information may be obtained from a user profile associated with the user and maintained on the user device 110. The user profile may include data that is indicative of the user's use of each of the one or more native applications 111, 112, 113, 114, 115 installed on the user device 110.

The vector generation unit 140 may then generate a query vector 146*a* based on the (i) one or more search terms 192 and (ii) the context information that is indicative of the user context. For example, the vector generation unit 140 may extract features from the one or more search terms 192, the context information that is indicative of the user context, or both and use the extracted features to generate the query vector 146*a*. In the example of FIG. 1, the query vector 146*a* is a numerical representation of (i) the one or more search terms 192 received via the user interface 190 at stage A and (ii) the context information that is indicative of the user context during a threshold period of time prior to the entry of the one or more search terms 192. The numerical representation of the query vector 146*a* quantifies a relationship between (i) the one or more search terms 192 and the context information, collectively, and (ii) an established cluster feature-vector vocabulary. Accordingly, features derived from the one or more search terms 192 and features derived from the user context may be the built into the query vector 146a that can be evaluated to determine the query vector's 146a similarity to one or more cluster feature-vectors 151, 152, 153, 154, 155 stored in the search engine index 150. The vector generation unit 140 may provide 146 the query vector 146a to the vector similarity unit 160.

The vector similarity unit 160 is configured to receive the query vector 146a. The vector similarity unit 160 can access 148 the search engine index 150 to identify one or more cluster feature-vectors 151, 152, 153, 154, 155 that are similar to the query vector 146a. A cluster feature-vector 151, 152, 153, 154, 155 may be similar to the query vector 146a if the cluster feature-vector 151, 152, 153, 154, 155 satisfies a predetermined similarity threshold. In some implementations, determining whether a cluster feature-vector 151, 152, 153, 154, 155 satisfies a predetermine similarity threshold may be based on the distance between the query vector 146a and each respective cluster feature-vector 151, 152, 153, 154, 155. A distance between the query vector 146a and each respective cluster feature-vector 151, 152, 153, 154, 155 may be determined, for example, using a cosine distance function. The cluster feature-vector identification process may result in a set of cluster feature-vectors that are sufficiently similar to the query vector 146a.

The vector similarity unit 148 analyzes the set of cluster feature-vectors that are sufficiently similar to the query vector 146a to identify one or more topics, tasks, or the like that are associated with the set of cluster feature-vectors that are sufficiently similar to the query vector 146a. Analyzing a set of cluster feature-vectors may include, for example, using one or more clustering algorithms to group the set of cluster feature-vectors identified by the vector similarity unit 148 into one or more groups of cluster feature-vectors. For example, the identified set of cluster feature-vectors may be clustered based on a message recipient that is associated with the cluster feature-vectors, based on an entity associated with the cluster feature-vectors, based on an event associated with the cluster feature-vectors, based on the native application that is associated with the cluster feature-vectors, or the like. The clustering algorithms employed by the present disclosure may include any clustering algorithm capable of identifying groups of related cluster feature-vectors such as the k-means clustering algorithm (e.g., centroid based algorithm), hierarchical clustering, distribution based clustering, or the like. Alternatively, a stream clustering algorithm may be employed to identify groups of related cluster feature-vectors.

The vector similarity unit 148 may perform clustering of cluster feature-vectors asynchronously. For example, the vector similarity unit 148 may perform clustering independent of a user opening an application (e.g., a search application) that displays a user interface such as user interface 190. In some implementations, asynchronous clustering may be performed as a background process while a user uses the user device 110 to perform other tasks, while the user device 110 is not being used by a user, when the user device 110 is in sleep mode, when a user device 110 is charging its battery, a combination thereof, or the like. Alternatively, vector similarity unit 148 may perform clustering of cluster feature-vectors in real-time at runtime in response to a received query. Such real-time clustering of cluster feature-vectors at runtime may occur, for example, if more than a threshold period of time has elapsed since the most recent iteration of asynchronous clustering performed by the user device 110.

The vector similarity unit 160 may execute one or more clustering algorithms that may begin with one or more respective anchor cluster feature-vectors that the vector similarity unit 160 previously identified as being sufficiently similar to the query vector 146a. Then, for each anchor cluster feature-vector, the vector similarity unit 160 may perform a search for other cluster feature-vectors in the search engine index 150 that are sufficiently similar to the anchor cluster feature-vector. One or more other cluster feature-vectors in the search engine index 150 may be sufficiently similar to the anchor cluster feature-vector if the one or more other cluster feature-vectors are within a predetermined distance of the anchor cluster feature-vector. The distance between the anchor cluster feature-vector and the one or more other cluster feature-vectors may be calculated, for example, using a cosine distance function. The vector similarity unit 160 may use a clustering algorithm to perform a search that gradually radiates out from the anchor cluster feature-vector until the clustering algorithm no longer detects other cluster feature-vectors that satisfy a predetermined similarity threshold to the anchor cluster-feature vector. The vector similarity unit 148 may provide the identified groups (or clusters) of cluster feature-vectors to the user interface generation unit 170.

In some implementations, the vector similarity unit 160 may access a global language model provided by one or more cloud services using the cloud interface unit 180. The global language model may provide data that can be used by the vector similarity unit 160 to identify relationships between two or more cluster feature-vectors. For example, the vector similarity unit 140 may identify, based on data received from a global language model, synonyms and similar concepts. For example, the vector similarity unit 140 may use data received from the global language model to determine that cluster feature-vectors having features derived from words such as flight, trip, and hotel are related words. By way of a different example, data obtained from a global language model may be used by the vector similarity unit 160 to determine that cluster feature-vectors derived from native application content that includes the term "Piazza Navona" is related to cluster feature-vectors derived from a native application content item that includes the term "Italy." By way of yet another example, data obtained from a global model may be used by the vector similarity unit 160 to determine that a cluster feature-vector derived from native application content such as a document about Italy is similar to a travel booking for a flight to "Rome" but not similar to a travel booking for a flight to "Paris."

Alternatively, or in addition, one or more content graphs provided by one or more cloud services may be accessed to identify particular relationships in application usage. For example, an app content graph provided by one or more cloud services can be accessed using the cloud interface unit 180 to determine that applications such as the travel app 111 and the trip mentor app 114 are related native applications that are related to a trip. Accordingly, vector similarity unit 160 may use this native application relatedness data to determine that cluster feature-vectors from groups of two more native applications may be related.

The user interface generation unit 170 receives one or more groups of cluster feature-vectors. The user interface generation unit 170 may perform one or more post processing operations on the received groups of cluster feature-vectors. The user interface generation unit 170 may modify 172 a user interface using the results of the post processing operations.

For example, the user interface generation unit 170 may generate a title for each identified group of cluster feature-vectors. A title for a group of cluster feature-vectors may include, for example, a natural text label that helps a user of the user device 110 understand a particular topic, task, or the like that is associated with the native application content represented by the group of cluster feature-vectors. The title for the group of cluster feature-vectors can be generated using data obtained 182 from a global language model provided by a cloud server using the cloud interface unit 180 and a set of curated patterns such as "Trip to <Location>," "Meeting with <Person>," "<Event> Party," or the like. Alternatively, in some implementations, a title for a group of cluster feature-vectors may include a contact name associated with the clustered content, a location associated with the clustered content, or the like.

Alternatively, or in addition, the user interface generation unit 170 may rank the groups of cluster feature-vectors that were identified by the vector similarity unit 160. In some implementations, the identified groups of cluster feature-vectors may be ranked based on how recently native application content items represented by one or more cluster feature-vectors in the identified group of cluster feature-vectors was accessed by a user of the user device 110. Alternatively, or in addition, the identified groups may be ranked based on the amount of native application content items represented by the cluster. Other types of ranking methods may also be employed to rank the identified groups of cluster feature-vectors. For example, groups of cluster feature-vectors may also be identified, for example, based on frequency with which the native application content items represented by the group of cluster feature-vectors are accessed by user of the user device 110, the frequency with which the native application content items were shared by the user of the user device 110 with users of other user devices, the frequency with which the native application content items were shared by the user of the user device 110 with a social media site, or the like.

The user interface generation unit 170 may generate a selectable control such as selectable controls 192a, 192b, 192c for display on the use interface 190 at stage A in response to the vector similarity search performed by the vector similarity unit 160 based on the query vector 146a derived from (i) the one or more search terms 192 input by the user of the user device 110 and (ii) the context information that is indicative of the user context. The user interface generation unit 170 may associate a particular group of cluster feature-vectors with each selectable control. In response to the selection of a selectable control such as selectable control 192a, the user interface generation unit 170 may provide search results that identify native application content items that are represented by cluster feature-vectors in the group of cluster feature-vectors associated with the selected selectable control 192a.

The initial set of selectable controls 192a, 192b, 192c may be based on the set of the highest ranked groups of cluster feature-vectors identified by the user interface generation unit 170. In the example of FIG. 1, the user interface unit 170 may have ranked the group of cluster feature-vectors associated with the contact "April Smith" as the highest ranked group of cluster feature-vectors because the user most recently sent a message to "April" using the native application 115. The user interface unit 170 may have also highly ranked the group of cluster feature-vectors associated with the location "Italy" based on factors such as (i) the user has recently viewed content about Italy, (ii) the user has recently sent messages about Italy, and (iii) the group of cluster feature-vectors related to Italy includes more than a threshold number of cluster feature-vectors. Then, the user interface generation unit 170 has highly ranked an additional group of cluster feature-vectors related to a "Bday Party" due to other messages sent by the user of the user device to April Smith using the messaging app. The user interface generation unit 170 may associate each of the top ranked groups of cluster feature-vectors with selectable controls 192a, 192b, 192c, respectively. Each respective selectable control 192a, 192b, 192c may labeled with the title of the group of cluster feature-vectors that was generated by the user interface generation unit 170 such as "April Smith," "Italy," and "Bday Party," respectively.

Though the display of an initial set of selectable controls 192a, 192b, 192c corresponding to groups of cluster feature-vectors are shown in stage A as being provided in response to one or more search terms 192 input by a user of the user device 110, the present disclosure need not be so limited. For example, an initial set of selectable controls 192a, 192b, 192c may be provided when a user opens an application that provides the interface 190 prior to the input of any search terms as a response to a zero-input query. For example, prior to the input of any alphanumeric characters into the query field 191, the search engine 100 may receive data indicative of a zero-input query into the vector generation unit 140 which can generate a query vector for the zero-input query. The zero-input query vector may be a query vector that includes a numerical representation of one or more features extracted from the user context. The vector similarity unit 160 may identify one or more groups of cluster feature-vectors related to the zero-input query. The user interface generation unit 170 may rank the received one or more groups of cluster feature-vectors. The user interface generation unit 170 may select the one or more groups of cluster feature-vectors that are associated with native application content that was most recently accessed by the user of the user device, one or more groups of cluster feature-vectors that are associated with native application content that is most frequently accessed by the user of the user device, one or more groups of cluster feature-vectors that are associated with native application content related to the contact that the user most frequently communicates with, one or more groups of cluster feature-vectors that are associated with native application content related to the contact that the user most recently communicated with, or the like. Then, the user interface generation unit 170 may provide 172 for display on the user device 110 one or more selectable controls that are associated with the selected groups of cluster feature-vectors in response to the zero-input query, with the groups of cluster feature-vectors being selected based on the group ranking assigned to each respective group of cluster feature-vectors.

At stage B, the user of user device 110 may select the selectable control 192a that is associated with the group of cluster feature-vectors titled "April Smith." In response to the selection of selectable control 192a, the user interface generation unit 170 may provide a set of search results that each reference a native application content item that is represented by one of the cluster feature-vectors in the group of cluster feature-vectors associated with the selectable control 192a. In this instance, the group of cluster feature-vectors associated with the selectable control 192a is all messages sent to "April Smith." In the example of FIG. 1, the user sent two messages to April Smith using native application 112 and native application 115, which in this example are representative of the same messaging application. The group of cluster feature-vectors associated with the selectable control 192a includes a group of cluster feature-vectors for all messages sent to "April Smith" using the messaging app. In the example of FIG. 1, the cluster "April Smith" results in the display of search results that reference native application content items such as messages sent to April. The search results are displayed under the heading of the same native application (e.g., the messaging application 193) because the same native application was used to generate the native application content items referenced by the search results. In particular, the search results include a first search result 193a that references a native application content item such as a message sent to April about Bob's Gelato in Washington, D.C. and a second search result 193b that references a native application content item such as a message sent to April about Luigi's Gelato in Piazza Navona 193b.

The example described with respect to the user interface 190 at stage B assumes that messaging application 112 and messaging application 115 are the same messaging application. However, the present disclosure need not be so limited. Though both applications are messaging applications 112, 115 may be the same messaging application (e.g., an email application), the messaging applications 112, 115 may also be different messaging applications (e.g., an email application and an SMS messaging application). In such an example, the first search result 193a and the second search result 193b would still both be presented in response to the selection of the selectable control 192a for the reasons identified above. However, the first search result 193a would be listed under a heading associated with a first messaging application and the second search result 193b would be listed under a different heading associated with a second messaging application.

At stage C, the user of the user device may decide to retrieve messages related to a different topic or task. In this example, the user has selected selectable control 192b that relates to the task of a trip to "Italy." In response to the selection of the selectable control "Italy" 192b, the user interface generation unit 170 may provide a set of search results that each reference a native application content item that is represented by one of the cluster feature-vectors in the group of cluster feature-vectors associated with the selectable control 192b. Then, the search results may be organized based on the native application type that was used to generate each respective native application content item that is referenced by each respective search result.

In the example of FIG. 1, the selection of the selectable control "Italy" 192b returns search results corresponding to a group of cluster feature-vectors related to the user's upcoming trip to Italy. This set of cluster feature-vectors represents native application content items generated by multiple different native applications. For example, this set of cluster feature-vectors represents native application content items generated by the messaging app, the travel app, and the trip mentor app. The respective search results that reference native application content items from each of the respective native applications are organized on the user interface under the headings 193, 194, and 195 respectively. Respective search results 193a, 194a, 194b, 195a may each be grouped under the heading of the native application that was used to generate the native application content items referenced by the search results 193a, 194a, 194b, 195a.

Accordingly, by searching a search engine index 150 using a query vector generated based on the search term "April" and the user context, the search engine 100 is able to recommend a selectable control to the user that is associated with the user's upcoming trip to Italy with April. Such a system can suggest tasks to the user that include highly accurate search results such as articles browsed using a "Trip Mentor App" that do not include the search term 192 "April" that the user of the user device 110 input into the query field 191. Thus, the search engine 100 can enhance search results in comparison to systems that use keyword-based searching.

Moreover, the search engine 100 that indexes native application content using the cluster feature-vector disclosed herein can provide the user with the opportunity to revisit and review only native application content that corresponds to a particular topic or task. For example, by requesting only search results that reference native application content relevant to the task of the trip to "Italy," the user can review native application content particularly related to the task of the trip to "Italy" while the search engine 100 filters out native application content that is not related to the trip to "Italy."

By way of example with reference to FIG. 1, the search engine 100 may yield selectable controls 192a, 192b, 192c in response to a received input search term of "April." Then, as shown at stage C the user device may receive a request for native application content related to the trip to "Italy" when the user selects the selectable control "Italy" 192b. In response to the selection of the selectable control "Italy" 192b, the search engine 100 identifies, and returns search results referencing messages to April about the trip to "Italy" while eliminating search results that identify messages to April that are not about the trip to "Italy"—even if such messages include similar keywords. For example, using the cluster feature-vector based search engine 100, the user device 110 can determine based on vector similarity analysis described in this specification that the message to April about Bob's Gelato in DC is not related to the trip to "Italy" while the message to April about Luigi's Gelato in Piazza Navona is related to the trip to "Italy."

FIG. 2 is an example of a cluster feature-vector 210 that can be used to represent data from native applications.

The search engine 100 disclosed by this specification uses a cluster feature-vector 210 to facilitate search and retrieval of native application content. Each cluster feature-vector 210 is a numerical representation of a set of data generated by a native application. The set of data generated by a native application may include, for example, native application content and context information associated with a user's interaction with one or more native applications. The numerical representation of each cluster feature-vector 210 is determined with reference to a cluster feature-vector vocabulary 200.

The cluster feature-vector vocabulary 200 includes many fields. For example, the cluster feature-vector vocabulary 200 may include tens of thousands of fields, hundreds of thousands of fields, or more. Each field of the cluster feature-vector vocabulary 200 corresponds to a feature that may be extracted from a set of data generated by a native application that includes native application content, context information associated with one or more native applications, or both.

In some implementations, the cluster feature-vector vocabulary 200 may include a field for each known word, each known phrase, or both 201. The set of each known word or phrase may be determined, for example, using a dictionary. The set of known words or phrases may also include multiple known entities including location names, city names, business names, and the like.

In addition, the cluster feature-vector vocabulary 200 may include one or more fields for each different type of context information. For example, the feature vector vocabulary 200 may include fields 202 that each correspond to a document field that may be found in native application content. Document fields in native application content may include, for example, a "To:" field of a message, a "Subject" field of a message, a "Body" field of a message, a "Destination" field of a flight reservation, a "Date" field of a hotel reservation, a "Title" field of an article, or the like. Alternatively, or in addition, the cluster feature-vector vocabulary 200 may include fields 203 that correspond to the native application associated with the application content item which the vector 210 represents. Alternatively, or in addition, the cluster feature-vector vocabulary 200 may include fields 204 that correspond to the most recently used native applications. Alternatively, or in addition, the cluster feature-vector vocabulary 200 may include fields 205 that correspond to native applications open on the user device when the user interacted with the content item on which the cluster feature-vector 210 represents.

A cluster feature-vector 210 may be represented as an array of numerical values. Each numerical value in the array of numerical values may quantify a relationship between each respective feature of a native application content item, context information associated with one or more native applications, or both. The numerical values may include any numerical value(s) such as binary digits, scalar values, or the like. The cluster feature-vector 210 is an example of a cluster feature-vector that can be generated for the set of data 135 generated by the native application 115 in FIG. 1. All numerical values used with reference to FIG. 2 are purely exemplary.

The cluster feature-vector 210 for the set of data 135 generated by the native application 115 may include a value "0.75" for the entry 220*a* corresponding to the feature word "Gelato" 220 indicating that the feature word "Gelato" 220 appears in the set of data 135. The cluster feature-vector 135 may also include a value "0.95" for the entry 221*a* corresponding to the feature entity "Piazza Navona" 221 indicating that the feature entity "Piazza Navona" appears in the set of data 135. In a similar manner, cluster feature-vector 210 may include a value of "0" assigned to the entry for features such as "Agent," "Bob," and "Hotel," for example, because those feature words do not appear in the set of data 135.

The cluster feature-vector 210 may also include numerical values related to the context information provided in the set of data 135. For example, the entry corresponding to the "To:" field feature 222 may include a value "0.36" 222*a* that indicates the native application content item represented by the feature vector 210 included a "To:" field, that the "To:" field includes text of "April," or a combination of both. The entry 223*a* may assign a value of "1" to the "Messaging Application" because the "Messaging Application" was used to create the set of data that the cluster feature-vector 210 represents. The entries 224*a*, 225*a* may include values of "0.85" and "0.95" for the features 224, 225, respectively, indicating that the "Trip Mentor App" was the most next most recently used native application (prior to the messaging application generating the set of data on which the cluster feature-vector 210 is based) and that the "Travel App" was the second most recently used native application (prior to the messaging application generating the set of data on which the cluster feature-vector 210 is based). The entries 226*a*, 227*a*, 228*a* may be assigned a value that is indicative of whether or not the feature applications 226, 227, 228, respectively, were open on the user device when the set of data 135 on which the cluster feature-vector is based was generated.

As the cluster feature-vector vocabulary 200 and the cluster feature-vector 210 described with reference to FIG. 2 are merely exemplary, in some implementations the cluster feature-vector vocabulary may include more features, less features, or different features.

Figure 3:
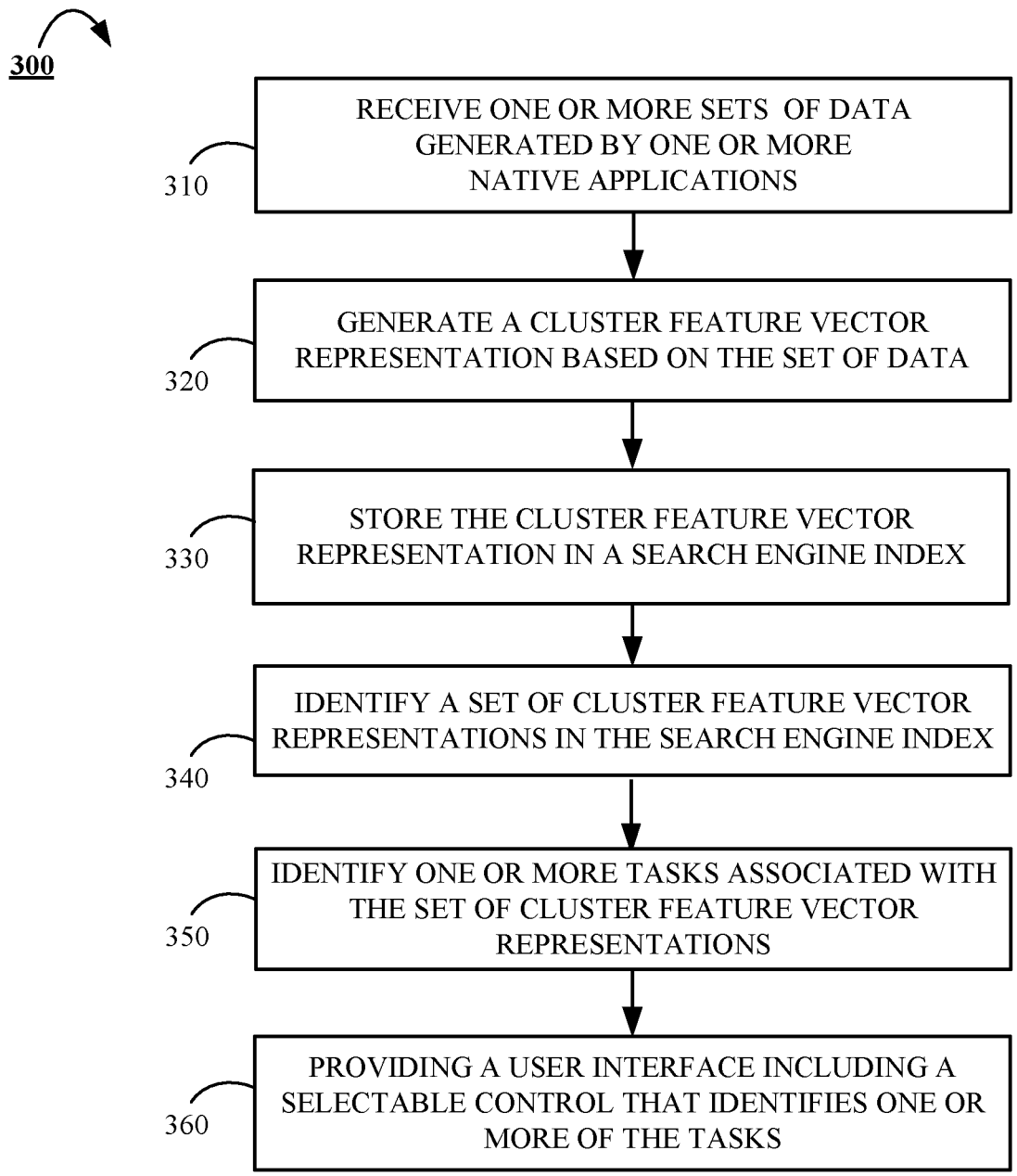
FIG. 3 is a flowchart of an example of a process for using a search engine to retrieve application content items.

FIG. 3 is a flowchart of an example of a process 300 for using a search engine 10 to retrieve application content items. For convenience, the process 300 will be described as being performed by a user device. For example, the user device 110 of FIG. 1, when appropriately programmed in accordance with this specification, can perform the process 300.

A user device may begin performance of the process 300 by receiving 310 one or more sets of data generated by one or more native applications. Each respective set of data may include native application content and context information associated with a user's interaction with one or more native applications. Context information may include information related the native application that generated the set of data, information related to the user's use of the native application that generated the set of data, information related to the user's use of other native applications in proximity to the native application, or the like. Examples of the types of context information may include, for example data that is indicative of a field that is associated with native application content a user interacted with, data that is indicative of user activity with a native application, data that is indicative of native application content creation time, data that is indicative of native application content interaction time, data that is indicative of a number of native application interactions, or the like.

The user device may generate 320 a cluster feature-vector representation based on each set of data received from a native application. Generating a cluster feature-vector may include processing a set of data to extract multiple features from both the native application content and the context information associated with a user's interaction with one or more native applications. The generated cluster feature-vector is a numerical representation of each set of data that is received from the native applications. The numerical representation quantifies a relationship between each respective set of data and an established cluster feature-vector vocabulary.

Features associated with the native application content may include, for example, features associated with every word in the native application content. The text of the application content may be annotated based on the application fields associated with the content. Accordingly, features associated with the structure of the native application document used to receive and display text on the native application interface may be the built into the cluster feature-vector.

Alternatively, or in addition, features extracted from the native application content may include features corresponding to entity names such as contact names, non-contact person names, place names, country names, city names, business names, or the like included in the native application content. Accordingly, features associated with particular entity names that exist in the text of application content may be built into the cluster feature-vector.

In addition to features extracted from native application content, the cluster feature-vector may also be generated based on features extracted from the context information received in the set of data from a native application. Features extracted from the context information may include, for example, features extracted from data indicative of user activity with one or more native applications installed on the user device. For example, features may be extracted from the context information that is indicative the popularity of native applications installed on the user device. Alternatively, or in addition, features may be extracted from the context information that are indicative of a user's pattern of switching between applications independent of session, a user's pattern of switching between applications in the same session, or the like. Alternatively, or in addition, features may be extracted from the context information based on application content creation time, application content interaction time, number of interactions with a native application, or the like.

The user device may store 330 each generated cluster feature-vector representation in a search engine index. The search engine index is a cluster feature-vector storage area that organizes each of the cluster feature-vectors generated at stage 320. Accordingly, the search engine index stores multiple cluster feature-vectors that each provide a numerical representation of the sets of data generated by the native applications. Each cluster feature-vector stored in the search engine index may be used to identify a native application content item on which the cluster feature-vector is based. Therefore, instead of, or in addition to, performing a keyword search based of application content items, the user device may use the search engine to perform a vector similarity search of the cluster feature-vectors stored in the search engine index.

The user device may identify 340 a set of cluster feature-vector representations in a search engine index. Identifying a set of cluster feature-vectors may include, for example, the user device generating a query vector and then using the query vector to search the search engine index. Searching the search engine index may include, for example, performing a similarity analysis between the query vector and one or more cluster feature-vectors stored in the search engine index. The user device may identify one or more cluster feature-vector representations as being similar to the query vector if a calculated similarity measure between the query vector and each of the one or more cluster feature-vector representations satisfies a predetermined threshold. In some implementations, the calculated similarity measure may include a distance that exists between the query vector and one or more of the cluster feature-vector representations stored in the search engine index. The distance between the query vector and the one or more cluster feature-vectors may be calculated, for example, using a cosine function.

The query vector may include a numerical representation that is generated based on one or more search terms and a user context. The one or more search terms may include one or more terms input by a user or a zero-input query. The user context may include context information that is associated with the user's interaction with one or more native applications installed on the user device. The context information may include data that is indicative of user interaction with one or more other native applications installed on the user device, data that is indicative of the one or more applications that the user has recently used, data that is indicative of the order in which the user has recently used native applications, or the like. In some implementations, the context information may be obtained from a user profile associated with the user and maintained on the user device. The user profile may include, among other things, data that is indicative of the user's usage of one or more other native applications installed on the user device.

The user device may identify 350 one or more topics, tasks, or the like that are associated with the set of cluster feature-vector representations. Identifying one or more topics, tasks, or the like that are associated with the set of cluster feature-vector representations includes, for example, using one or more clustering algorithms to group the set of cluster feature-vector representations identified at stage 340 into one or more groups of cluster feature-vectors. For example, the identified set of cluster feature-vector representations may be clustered based on a message recipient that is associated with the cluster feature-vectors, based on an entity associated with the cluster feature-vectors, based on an event associated with the cluster feature-vectors, based on the native application that is associated with the cluster feature-vectors, or the like. The clustering algorithms employed by the present disclosure may include any clustering algorithm capable of identifying groups of related cluster feature-vectors such as the k-means clustering algorithm, k-nearest neighbor classification, or the like.

In some implementations, the client device may use information obtained from a global language model provided by one or more cloud services to identify relationships between two or more cluster feature-vectors. In some implementations, data from one or more global language models can be used by the user device to identify synonyms and similar concepts. For example, data from one or more global language models may be used to determine words such as flight, trip, and hotel are related words. In the same, or other implementations, data from one or more global language models can be used by the user device to identify relationships between geographic locations, associate landmarks with a geographic location, or the like. For example, data from one or more global language models may be used to determine that native application content that includes the term "Piazza Navona" is related to a native application content item that includes the term "Italy." Alternatively, or in addition, one or more content graphs may be accessed to identify particular relationships in application usage. For example, an app content graph can be accessed to determine that applications such as a travel app and a trip mentor app are related native applications that are related to a trip a user is planning. The global language models may be installed on the client device or hosted by one or more cloud services.

The user device may provide 360 a user interface including a selectable control that identifies one or more of the topics, tasks, or the like. Each selectable is associated with the group of cluster feature-vectors that define the topic, task, or the like. In response to the selection of the selectable control, the user device may provide search results that identify native application content items included in the group of cluster feature-vectors associated with the selectable control.

The initial set of one or more selectable controls may be based on the set of the highest ranked topics, tasks, or the like. The topics, tasks, or the like may be ranked based on whether the respective topics, tasks, or the like include native application content items that were most recently interacted with, most frequently interacted with, or the like. Alternatively, or in addition, topics, tasks, or the like may be ranked based on the number of native content application items associated with the topic, task, or the like. Each respective selectable control may be labeled with the title of the topic, task, or the like that was generated for the respective topic, task, or the like.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively, or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube), LCD (liquid crystal display), LED (light-emitting diode), or OLED (organic light-emitting diode) monitor, for displaying information to the user and a keyboard and a pointing device, e.g., a mouse, a trackball, or a touchscreen, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

What is claimed is:

1. A computer-implemented method, comprising:
   receiving, by a search engine implemented on a user device and for each of multiple native applications on the user device, a set of data that is generated by the native application and that includes (i) native application content, and (ii) context information associated with the native application content;
   for each set of data that is generated by each of the multiple native applications, indexing, by the search engine implemented on the user device the set of data to generate index data;
   storing, by the search engine implemented on the user device, the index data on the user device;
   identifying, by the search engine implemented on the user device and from the index data, a plurality of tasks, wherein each identified task is associated with an overarching topic of user activities distributed across two or more of the multiple native applications, and wherein the user activities can be performed to collectively achieve the task associated with the overarching topic of user activities;
   providing, for output, a user interface including one or more selectable controls that each identify one of the plurality of tasks, and wherein each selectable control, when selected, causes the search engine to generate, in a search results page, search results that relate to the one of the plurality of tasks and that are organized into groups for the respective two or more of the multiple native applications;
   receiving, by the search engine implemented on the user device, data indicative of a selection of a particular selectable control of the one or more selectable controls, wherein the particular selectable control corresponds to a particular task of the plurality of tasks;
   in response to receiving the data indicative of the selection of the particular selectable control corresponding to the particular task of the plurality of tasks, generating, by the search engine implemented on the user device, in the search results page, a set of search results associated with the user activities that can be performed to collectively achieve the particular task associated with the overarching topic, wherein the set of search results are organized into separate groups for the respective two or more of the multiple native applications, wherein the search results are grouped according to which native application was used to generate the search results; and
   providing, by the search engine implemented on the user device, the search results page for output on a display of the user device.

2. The computer-implemented method of claim 1, wherein the index data includes words that were extracted from one or more words in a text of the native application content.

3. The computer-implemented method of claim 1, wherein the index data includes data that were extracted from data that is indicative of one or more fields associated with the native application content.

4. The computer-implemented method of claim 1, wherein the index data includes data that was that extracted from data indicative of popularity of one or more native application installed on the user device.

5. The computer-implemented method of claim 1, wherein the index data includes data that were extracted from data that is indicative of one or more native applications that were accessed during the same session as the generated set of data.

6. A device comprising:
   one or more processor(s); and
   one or more storage devices storing instructions that are operable, when executed by the one or more processors, to cause the device to perform operations comprising:
   receiving, by a search engine implemented on a user device and for each of multiple native applications on the user device, a set of data that is generated by the native application and that includes (i) native application content, and (ii) context information associated with the native application content;
   for each set of data that is generated by each of the multiple native applications, indexing, by the search engine implemented on the user device the set of data to generate index data;
   storing, by the search engine implemented on the user device, the index data on the user device;
   identifying, by the search engine implemented on the user device and from the index data, a plurality of tasks, wherein each identified task is associated with an overarching topic of user activities distributed across two or more of the multiple native applications, wherein the user activities can be performed to collectively achieve the task associated with the overarching topic of user activities;
   providing, for output, a user interface including one or more selectable controls that each identify one of the plurality of tasks, and wherein each selectable control, when selected, causes the search engine to generate, in a search results page, search results that relate to the one of the plurality of tasks and that are organized into groups for the respective two or more of the multiple native applications;
   receiving, by the search engine implemented on the user device, data indicative of a selection of a particular selectable control of the one or more selectable controls, wherein the particular selectable control corresponds to a particular task of the plurality of tasks;

in response to receiving the data indicative of the selection of the particular selectable control corresponding to the particular task of the plurality of tasks, generating, by the search engine implemented on the user device, in the search results page, a set of search results associated with the user activities that can be performed to collectively achieve the particular task associated with the overarching topic, wherein the set of search results are organized into separate groups for the respective two or more of the multiple native applications, wherein the search results are grouped according to which native application was used to generate the search results; and providing, by the search engine implemented on the user device, the search results page for output on a display of the user device.

7. The device of claim 6, wherein the index data includes words that were extracted from one or more words in a text of the native application content.

8. The device of claim 6, wherein the index data includes data that were extracted from data that is indicative of one or more fields associated with the native application content.

9. The device of claim 6, wherein the index data includes data that was extracted from data indicative of popularity of one or more native application installed on the user device.

10. The device of claim 6, wherein the index data includes data that were extracted from data that is indicative of one or more native applications that were accessed during the same session as the generated set of data.

11. A non-transitory computer-readable medium storing software comprising instructions executable by a computer which, upon such execution, cause the computer to perform operations comprising:

receiving, by a search engine implemented on a user device and for each of multiple native applications on the user device, a set of data that is generated by the native application and that includes (i) native application content, and (ii) context information associated with the native application content;

for each set of data that is generated by each of the multiple native applications, indexing, by the search engine implemented on the user device the set of data to generate index data;

storing, by the search engine implemented on the user device, the index data on the user device;

identifying, by the search engine implemented on the user device and from the index data, a plurality of tasks, wherein each identified task is associated with an overarching topic of user activities distributed across two or more of the multiple native applications, wherein the user activities can be performed to collectively achieve the task associated with the overarching topic of user activities;

providing, for output, a user interface including one or more selectable controls that each identify one of the plurality of tasks, and wherein each selectable control, when selected, causes the search engine to generate, in a search results page, search results that relate to the one of the plurality of tasks and that are organized into groups for the respective two or more of the multiple native applications;

receiving, by the search engine implemented on the user device, data indicative of a selection of a particular selectable control of the one or more selectable controls, wherein the particular selectable control corresponds to a particular task of the plurality of tasks;

in response to receiving the data indicative of the selection of the particular selectable control corresponding to the particular task of the plurality of tasks, generating, by the search engine implemented on the user device, in the search results page, a set of search results associated with the user activities that can be performed to collectively achieve the particular task associated with the overarching topic, wherein the set of search results are organized into separate groups for the respective two or more of the multiple native applications, wherein the search results are grouped according to which native application was used to generate the search results; and providing, by the search engine implemented on the user device, the search results page for output on a display of the user device.

* * * * *